United States Patent
Zelig et al.

(10) Patent No.: US 7,593,400 B2
(45) Date of Patent: Sep. 22, 2009

(54) MAC ADDRESS LEARNING IN A DISTRIBUTED BRIDGE

(75) Inventors: David Zelig, Givatayim (IL); Leon Bruckman, Petah Tikva (IL); Ronen Solomon, Givatayim (IL); Zeev Oster, Modi'in (IL); David Rozenberg, Rehovot (IL); Uzi Khill, Netanya (IL)

(73) Assignee: Corrigent Systems Ltd., Tel Aviv (IL)

( * ) Notice: Subject to any disclaimer, the term of this patent is extended or adjusted under 35 U.S.C. 154(b) by 476 days.

(21) Appl. No.: 11/419,444

(22) Filed: May 19, 2006

(65) Prior Publication Data
US 2007/0268915 A1  Nov. 22, 2007

(51) Int. Cl.
*H04L 12/54* (2006.01)

(52) U.S. Cl. .......... 370/389; 370/392; 370/401

(58) Field of Classification Search ........... 370/389, 370/392, 400, 401, 428, 475; 709/238, 245
See application file for complete search history.

(56) References Cited

U.S. PATENT DOCUMENTS

| | | |
|---|---|---|
| 4,535,785 A | 8/1985 | van den Honert |
| 4,602,624 A | 7/1986 | Naples et al. |
| 4,628,942 A | 12/1986 | Sweeney et al. |
| 4,702,254 A | 10/1987 | Zabara |
| 4,867,164 A | 9/1989 | Zabara |
| 5,025,807 A | 6/1991 | Zabara |
| 5,159,595 A | 10/1992 | Flanagan et al. |
| 5,188,104 A | 2/1993 | Wernicke |
| 5,199,430 A | 4/1993 | Fang |
| 5,205,285 A | 4/1993 | Baker, Jr. |
| 5,215,086 A | 6/1993 | Terry, Jr. |
| 5,263,480 A | 11/1993 | Wernicke |
| 5,282,468 A | 2/1994 | Klepinski |
| 5,299,569 A | 4/1994 | Wernicke |
| 5,307,353 A | 4/1994 | Yamashita et al. |

(Continued)

OTHER PUBLICATIONS

Martini, et al. "Encapsulation Methods for Transport of Ethernet Frames Over IP/MPLS Networks." IETF Draft, May 2001, Available at: search.ietf.org/internet-drafts/draft-martini-l2circuit-encap-mpls-02.txt.

(Continued)

*Primary Examiner*—Wing F Chan
*Assistant Examiner*—Duc T Duong
(74) *Attorney, Agent, or Firm*—Darby & Darby P.C.

(57) ABSTRACT

A method for communication includes configuring a network node having at least first and second line cards, the line cards having respective ports, to operate as a distributed media access control (MAC) bridge in a Layer 2 network. Each of the line cards has a respective forwarding database (FDB). Upon receiving a data packet on a port of the network node from a MAC source address, the data packet is conveyed to at least the first line card for transmission to the MAC destination address. The MAC source address of the data packet is checked against the records in the FDB of the first line card. If the FDB does not contain a record of an association of the MAC source address with the port on which the data packet was received, the record is added to the FDB of the first line card, which sends a message to at least the second line card informing the second line card of the association.

20 Claims, 3 Drawing Sheets

U.S. PATENT DOCUMENTS

| | | | |
|---|---|---|---|
| 5,321,393 | A | 6/1994 | Carlton et al. |
| 5,335,657 | A | 8/1994 | Terry, Jr. |
| 5,461,611 | A | 10/1995 | Drake et al. |
| 5,540,730 | A | 7/1996 | Terry, Jr. |
| 5,571,150 | A | 11/1996 | Wernicke |
| 5,581,703 | A | 12/1996 | Baugher et al. |
| 5,596,569 | A | 1/1997 | Madonna et al. |
| 5,638,358 | A | 6/1997 | Hagi et al. |
| 5,706,516 | A | 1/1998 | Chang et al. |
| 5,707,400 | A | 1/1998 | Terry, Jr. |
| 5,755,750 | A | 5/1998 | Petruska |
| 5,925,137 | A | 7/1999 | Okanoue et al. |
| 5,959,968 | A * | 9/1999 | Chin et al. ............... 370/216 |
| 5,983,360 | A | 11/1999 | Ugajin et al. |
| 6,021,263 | A | 2/2000 | Kujoory et al. |
| 6,032,194 | A | 2/2000 | Gai et al. |
| 6,147,993 | A * | 11/2000 | Kloth et al. ............... 370/392 |
| 6,151,297 | A * | 11/2000 | Congdon et al. ............ 370/216 |
| 6,205,359 | B1 | 3/2001 | Boveja |
| 6,205,488 | B1 | 3/2001 | Casey et al. |
| 6,233,073 | B1 | 5/2001 | Bowers et al. |
| 6,246,667 | B1 | 6/2001 | Ballantine et al. |
| 6,256,292 | B1 | 7/2001 | Ellis et al. |
| 6,262,976 | B1 | 7/2001 | McNamara |
| 6,275,493 | B1 | 8/2001 | Morris et al. |
| 6,304,575 | B1 | 10/2001 | Carroll et al. |
| 6,314,110 | B1 | 11/2001 | Chin et al. |
| 6,330,229 | B1 | 12/2001 | Jain et al. |
| 6,339,488 | B1 | 1/2002 | Beshai et al. |
| 6,339,595 | B1 | 1/2002 | Rekhter et al. |
| 6,359,858 | B1 | 3/2002 | Smith et al. |
| 6,366,556 | B1 | 4/2002 | Ballintine et al. |
| 6,370,121 | B1 | 4/2002 | Hausman |
| 6,400,681 | B1 | 6/2002 | Bertin et al. |
| 6,408,001 | B1 | 6/2002 | Chuah et al. |
| 6,442,134 | B1 | 8/2002 | Mitchell |
| 6,446,131 | B1 | 9/2002 | Khansari et al. |
| 6,456,407 | B1 | 9/2002 | Tammela et al. |
| 6,456,587 | B2 | 9/2002 | Taniguchi |
| 6,466,985 | B1 | 10/2002 | Goyal et al. |
| 6,553,029 | B1 | 4/2003 | Alexander |
| 6,563,793 | B1 | 5/2003 | Golden et al. |
| 6,584,535 | B1 | 6/2003 | Ouellet et al. |
| 6,604,136 | B1 | 8/2003 | Chang et al. |
| 6,628,624 | B1 | 9/2003 | Mahajan et al. |
| 6,636,478 | B1 | 10/2003 | Sensel et al. |
| 6,639,893 | B1 | 10/2003 | Chikenji et al. |
| 6,639,896 | B1 | 10/2003 | Goode et al. |
| 6,647,008 | B1 | 11/2003 | Galand et al. |
| 6,665,273 | B1 | 12/2003 | Goguen et al. |
| 6,678,241 | B1 | 1/2004 | Gai et al. |
| 6,680,906 | B1 | 1/2004 | Nguyen |
| 6,680,912 | B1 | 1/2004 | Kalman et al. |
| 6,711,125 | B1 | 3/2004 | Walrand et al. |
| 6,724,880 | B1 | 4/2004 | Lynch |
| 6,731,597 | B1 | 5/2004 | Batchellor et al. |
| 6,735,198 | B1 * | 5/2004 | Edsall et al. ............... 370/389 |
| 6,757,286 | B1 | 6/2004 | Stone |
| 6,760,775 | B1 | 7/2004 | Anerousis et al. |
| 6,765,921 | B1 | 7/2004 | Stacey et al. |
| 6,778,496 | B1 | 8/2004 | Meempat et al. |
| 6,788,681 | B1 * | 9/2004 | Hurren et al. ............... 370/389 |
| 6,795,394 | B1 | 9/2004 | Swinkels et al. |
| 6,801,506 | B1 | 10/2004 | Dey |
| 6,807,172 | B1 | 10/2004 | Levenson et al. |
| 6,820,210 | B1 | 11/2004 | Daruwalla et al. |
| 6,826,158 | B2 | 11/2004 | Seaman et al. |
| 6,829,651 | B1 | 12/2004 | Bass et al. |
| 6,831,932 | B1 | 12/2004 | Boyle et al. |
| 6,879,559 | B1 | 4/2005 | Blackmon et al. |
| 6,879,594 | B1 | 4/2005 | Lee et al. |
| 6,886,043 | B1 | 4/2005 | Mauger et al. |
| 6,922,394 | B2 | 7/2005 | Kajiwara et al. |
| 6,925,054 | B1 | 8/2005 | Atterton et al. |
| 6,934,259 | B2 | 8/2005 | Klincewicz et al. |
| 6,985,447 | B2 | 1/2006 | Gibson et al. |
| 7,009,974 | B1 | 3/2006 | Fotedar |
| 7,317,722 | B2 * | 1/2008 | Aquino et al. ............... 370/390 |
| 7,424,018 | B2 * | 9/2008 | Gallatin et al. ............. 370/389 |
| 7,468,956 | B1 | 12/2008 | Leelanivas et al. |
| 2001/0022786 | A1 | 9/2001 | King et al. |
| 2001/0033575 | A1 | 10/2001 | Shimamura et al. |
| 2002/0015411 | A1 | 2/2002 | Kataoka et al. |
| 2002/0018482 | A1 | 2/2002 | Gotzer |
| 2002/0091795 | A1 | 7/2002 | Yip |
| 2002/0093949 | A1 | 7/2002 | Yasue et al. |
| 2002/0176450 | A1 | 11/2002 | Kong et al. |
| 2002/0179720 | A1 | 12/2002 | Liva et al. |
| 2003/0002443 | A1 | 1/2003 | Basso et al. |
| 2003/0026298 | A1 | 2/2003 | Bisson et al. |
| 2003/0061338 | A1 | 3/2003 | Stelliga |
| 2003/0074469 | A1 | 4/2003 | Busi et al. |
| 2003/0088698 | A1 | 5/2003 | Singh et al. |
| 2003/0147344 | A1 | 8/2003 | Stewart et al. |
| 2003/0196135 | A1 | 10/2003 | Gottlieb |
| 2003/0208618 | A1 | 11/2003 | Mor et al. |
| 2004/0022268 | A1 | 2/2004 | Busi et al. |
| 2004/0071089 | A1 | 4/2004 | Bauer et al. |
| 2004/0101303 | A1 | 5/2004 | Williams |
| 2004/0107285 | A1 | 6/2004 | Larson et al. |
| 2004/0156313 | A1 | 8/2004 | Hofmeister et al. |
| 2004/0165525 | A1 | 8/2004 | Burak |
| 2004/0202171 | A1 | 10/2004 | Hama |
| 2004/0228278 | A1 | 11/2004 | Bruckman et al. |
| 2005/0025069 | A1 | 2/2005 | Aysan |
| 2005/0135436 | A1 | 6/2005 | Nigam et al. |
| 2005/0180171 | A1 | 8/2005 | Huang et al. |
| 2006/0059325 | A1 | 3/2006 | Milne et al. |

OTHER PUBLICATIONS

Rosen, et al. "MPLS Label Stack Encoding." Request for Comments (RFC) 3032 of the Internet Engineering Task Force (IETF), Jan. 2001.

Awduche, et al. "Requirement for Traffic Engineering Over MPLS," published as IETF RFC 2702, Sep. 1999.

Deering, S., "Host Extensions for IP Multicasting," RFC 1112, Aug. 1989.

Lasserre, et al. "Virtual Private LAN Services Over MPLS draft-ietf-l2vpn-vpls-ldp-03.txt," Internet Draft Document—Provider Provisioned VPN Working Group, Jun. 2002 & Jan. 2003.

"SONET Bidirectional Line-Switched Ring Equipment Generic Criteria," A Module of TSGR, FR-440, GR-1230-CORE by Bellcore, Issue 4, Dec. 1998.

Baker, et al. "PPP Bridging Control Protocol (BCP)," in IETF RFC 1638, Jun. 1994.

Bradley, et al., "Multiprotocol Interconnect Over Frame Relay," in IETF RFC 1490, Jul. 1993.

Kompella, et al., "Virtual Private LAN Service," IETF draft-ietf-l2vpn-vpls-bgp-02.txt, May 2004.

IEEE Standard 802.17, "Part 17: Resilient Packet Ring (RPR) Access Method & Physical Layer Specifications," RPR Alliance 2002, 2003.

* cited by examiner

MAC ADDRESS LEARNING IN A DISTRIBUTED BRIDGE

FIELD OF THE INVENTION

The present invention relates generally to communication networks, and specifically to methods and systems for bridging in virtual private LAN services (VPLS) and other distributed bridging systems.

BACKGROUND OF THE INVENTION

Local Area Networks (LANs) connect computing systems together at the Layer 2 level. The term "Layer 2" refers to the second layer in the protocol stack defined by the well-known Open Systems Interface (OSI) model, also known as the logical link, data link, or Media Access Control (MAC) layer. Each computing system connects to a LAN through a MAC device. Multiple LANs can be connected together using MAC bridges, as set forth in the *IEEE Standard for Information Technology, Telecommunications and Information Exchange between Systems, Local and Metropolitan Area Networks, Common Specifications, Part 3: Media Access Control (MAC) Bridges*, published as ANSI/IEEE Standard 802.1D (2004), which is incorporated herein by reference. (The 802.1D standard, as well as other IEEE standards cited herein, is available at standards.ieee.org/catalog/.) MAC bridges that implement the 802.1D standard allow MAC devices attached to physically separated LANs to appear to each other as if they were attached to a single LAN. The bridge includes two or more MAC devices that interconnect the bridge ports to respective LANs.

MAC bridges maintain a forwarding database (FDB) to map destination MAC addresses of the packets they receive to bridge ports. The bridge builds the forwarding database by means of a learning process, in which it associates the source MAC address of each incoming packet with the port on which the packet was received. When the bridge receives an incoming packet whose destination address is not found in the database, it floods (i.e., broadcasts) the packet through all its available ports, except the one through which the packet arrived. Other MAC bridges that do not recognize the destination address will further flood the packet to all the relevant ports. Through the flooding mechanism, the packet will eventually traverse all interconnected bridges at least once, and will ultimately reach its destination.

Recently, various means have been proposed and developed for transporting Layer-2 packets, such as Ethernet frames, over high-speed, high-performance Layer-3 packet networks. Methods for this purpose are described, for example, by Martini et al., in "Encapsulation Methods for Transport of Ethernet Frames Over IP/MPLS Networks" (IETF draft-ietf-pwe3-ethernet-encap-11.txt, November, 2005), which is incorporated herein by reference. This draft, as well as other Internet drafts cited herein, is available from the Internet Engineering Task Force (IETF) at www.ietf.org/internet-drafts. The draft defines mechanisms for encapsulating Ethernet traffic for transportation over Internet Protocol (IP) networks using Multi-Protocol Label Switching (MPLS) or other tunneling methods, such as Generic Routing Encapsulation (GRE), as are known in the art.

According to the model proposed by Martini et al., native Ethernet LANs are connected to the IP network by provider edge (PE) devices, which are linked one to another by tunnels through the IP network. As a result of the encapsulation of Ethernet frames and associated processing functions, the IP network emulates Ethernet trunking and switching behavior and can thus be treated as an Ethernet "Pseudo-Wire" (PW). In other words, from the point of view of native Ethernet LANs that are connected to tunnels through the IP network, each PW is a virtual Ethernet point-to-point connection, emulating a physical connection between two Ethernet ports. Martini's encapsulation method may also be used in conjunction with virtual LANs (VLANs), as defined in IEEE standard 802.1Q.

Taking this functionality a step further, a number of authors have described methods for creating a virtual private LAN service (VPLS), which links different LANs together over an IP network. Such methods are described, for example, by Kompella et al., in "Virtual Private LAN Service" (IETF draft-ietf-l2vpn-vpls-bgp-06.txt, December, 2005) and by Lasserre et al., in "Virtual Private LAN Services over MPLS" (IETF draft-ietf-l2vpn-vpls-ldp-08.txt, November, 2005), which are incorporated herein by reference.

A VPLS (also known as a transparent LAN service—TLS) provides bridge-like functionality between multiple sites over a large network. Users connect to the VPLS via regular Ethernet interfaces. PWs between the nodes to which the users are connected form the VPLS entity itself. Every node in a VPLS acts as a virtual bridge. A virtual bridge node has "virtual ports," which are the endpoints of PWs that are part of the VPLS. The interfaces to which the users are actually connected are physical ports at the network edges. Both virtual and physical interfaces are treated identically from the point of view of frame forwarding and address learning. A single provider node can participate in multiple VPLS instances, each belonging to a different user. From the perspective of the end-user, the VPLS network is transparent. The user is provided with the illusion that the provider network is a single LAN domain. User nodes on different physical LANs can thus be joined together through VPLS connections to define a Layer 2 virtual private network (VPN), which appears to the users to be a single Ethernet LAN.

Link aggregation (LAG) is a technique by which a group of parallel physical links between two endpoints in a data network can be joined together into a single logical link (referred to as the "LAG group"). Traffic transmitted between the endpoints is distributed among the physical links in a manner that is transparent to the clients that send and receive the traffic. For Ethernet networks, link aggregation is defined by Clause 43 of IEEE Standard 802.3, *Carrier Sense Multiple Access with Collision Detection (CSMA/CD) Access Method and Physical Layer Specifications* (2002 Edition), which is incorporated herein by reference. Clause 43 defines a link aggregation protocol sub-layer, which interfaces between the standard Media Access Control (MAC) layer functions of the physical links in a link aggregation group and the MAC clients that transmit and receive traffic over the aggregated links. The link aggregation sub-layer comprises a distributor function, which distributes data frames submitted by MAC clients among the physical links in the group, and a collector function, which receives frames over the aggregated links and passes them to the appropriate MAC clients.

SUMMARY OF THE INVENTION

Embodiments of the present invention provide improved methods for MAC learning and network nodes that implement such methods. These methods are useful especially in the context of nodes that are configured to serve as virtual bridges in Layer 2 virtual private networks, as well as in distributed bridge nodes of other types, particularly when multiple ports of the node are conjoined in a LAG group. The principles of the present invention, however, may be applied, mutatis mutandis, to facilitate MAC learning in any distributed MAC learning environment.

In some embodiments of the present invention, a network node comprises multiple line cards having respective ports, and is configured to operate as a virtual MAC bridge in a Layer 2 virtual private network (VPN). (One example of such a VPN is a VPLS, as described above). Each of the line cards may typically serve as both ingress and egress for data packets and has a respective MAC forwarding database (FDB) that is shared by the ingress and egress functions. When an ingress line card receives an incoming data packet over the VPN on one of its ports, it consults the FDB in order to choose the line card and port through which the packet should be forwarded based on the MAC destination address (or floods the packet through the ports in the VPN when the MAC destination address does not appear in the FDB).

The egress line card (or line cards) that is to transmit the packet onward checks the MAC source address of the data packet against the records in its own FDB. If the FDB of the transmitting line card does not contain a record associating the MAC source address with the port of the ingress line card on which the data packet was received, the transmitting line card adds the record to its FDB. At an appropriate time, the line card sends a synchronization message to the remaining line cards, informing them of the association of the MAC source address with the ingress port. Typically, all line cards send their synchronization messages at certain predefined times, although under some circumstances, a synchronization message may be sent immediately upon entry of a new association in the FDB. Upon receiving the synchronization message, the other line cards update their own MAC FDBs as appropriate.

When the forwarding destination of a packet is a link aggregation group (LAG), LAG member selection (i.e., selection of the link over which the packet is to be forwarded) is typically performed on the ingress line card. In the absence of the synchronization method described above, other members in the LAG may not receive such packets for transmission, so that the FDB of the corresponding line cards will not be updated. When these line cards receive incoming packets, the result may be constant flooding, since the FDB is incomplete. The synchronization mechanism described herein avoids this problem by updating the FDB in all line cards in the LAG group (or across the entire VPN instance) within the node. Typically, when the transmitting line card transmits the data packet via a port that belongs to a LAG group, the synchronization message sent by the line card identifies the VPN instance and the incoming port. The other line cards in the same LAG group (as well as all the other line cards serving this VPN instance) can use this information to learn the MAC address association even when these other line cards have not yet received packets from the MAC address in question.

There is therefore provided, in accordance with an embodiment of the present invention, a method for communication, including:

configuring a network node having at least first and second line cards, the line cards having respective ports, to operate as a distributed media access control (MAC) bridge in a Layer 2 network;

providing for each of the line cards a respective forwarding database (FDB) to hold records associating MAC addresses with the respective ports of the network node;

receiving a data packet on one of the ports of the network node from a MAC source address, the data packet specifying a MAC destination address on the network;

conveying the received data packet in the network node to at least the first line card for transmission to the MAC destination address;

checking the MAC source address of the data packet against the records in the FDB of the first line card; and if the FDB of the first line card does not contain a record of an association of the MAC source address with the one of the ports on which the data packet was received, adding the record to the FDB of the first line card and sending a message to at least the second line card informing at least the second line card of the association.

In one embodiment, sending the message includes sending messages periodically at predefined times to inform at least the second line card of new associations between the MAC addresses and the respective ports.

Typically, the method includes receiving the message at the second line card, and responsively to the message, adding the record of the association to the FDB of the second line card if the record does not already exist in the FDB of the second line card. In a disclosed embodiment, the method includes marking the records in the respective FDB of each line card to distinguish a first type of the records, which are added in response to data packets transmitted via a port of the line card, from a second type of the records, which are added in response to messages received from another of the line cards. The method may further include associating a respective aging time with each of the records, refreshing the records in the FDB responsively to further packets transmitted by the line cards, and removing the records from the respective FDB if the records are not refreshed within the respective aging time.

In some embodiments, sending the message includes transmitting a synchronization packet from the first line card via a switching core of the network node to at least the second line card. In one embodiment, sending the synchronization packet includes, if the record in the FDB associates the MAC source address with a port different from the one of the ports on which the data packet was received, changing the record in the FDB of the first line card and sending a synchronization update packet to at least the second line card to indicate that the record has been changed.

In a disclosed embodiment, the first and second line cards have respective first and second ports, which are conjoined in a link aggregation (LAG), and conveying the received data packet includes transmitting the data packet to the MAC destination address via the first port, and wherein sending the message includes identifying the LAG group in the message so as to inform all the line cards that are members of the LAG group of the association. Typically, transmitting the data packet includes, when the MAC destination address does not appear in the FDB, flooding the data packet via the ports of the line cards, wherein the data packet is flooded via only a single one of the ports in the LAG group.

In some embodiments, the network node is configured to operate as multiple virtual MAC bridges in a Layer 2 virtual private network (VPN), wherein each virtual MAC bridge is configured to serve a respective VPN instance, and wherein the records associating the MAC addresses with the respective ports are maintained independently for each of the VPN instances. In a disclosed embodiment, the VPN instance is a VPLS instance among multiple VPLS instances served by the network node, and sending the message includes identifying the VPLS instance in the message so as to inform all the line cards that serve the VPLS instance.

Typically, the method includes conveying a further data packet, received from a further MAC source address, to the second line card for transmission over the network, checking the further MAC source address against the records in the FDB of the second line card, and responsively to the further data packet, adding a further record with respect to the MAC source address to the FDB of the second line card and sending a further message to inform at least the first line card of the further record.

There is also provided, in accordance with an embodiment of the present invention, a node for network communication, including:

a switching core;

a plurality of line cards configured to forward packets through the switching core so that the node operates as a virtual media access control (MAC) bridge in a Layer 2 network, the plurality of line cards including at least first and second line cards, each line card including respective ports and having a respective forwarding database (FDB) to hold records associating MAC addresses with the respective ports of the line cards, wherein the line cards are arranged so that upon receiving a data packet on one of the ports of one of the line cards from a MAC source address, the data packet specifying a MAC destination address, the one of the line cards conveys the data packet via the switching core to at least the first line card for transmission to the MAC destination address, whereupon the first line card checks the MAC source address of the data packet against the records in the FDB of the first line card and if the MAC database of the first line card does not contain a record of an association of the MAC source address with the one of the ports on which the data packet was received, adds the record to the FDB of the first line card and sends a message to at least the second line card informing at least the second line card of the association.

The present invention will be more fully understood from the following detailed description of the embodiments thereof, taken together with the drawings in which:

DETAILED DESCRIPTION OF EMBODIMENTS

Figure 1:
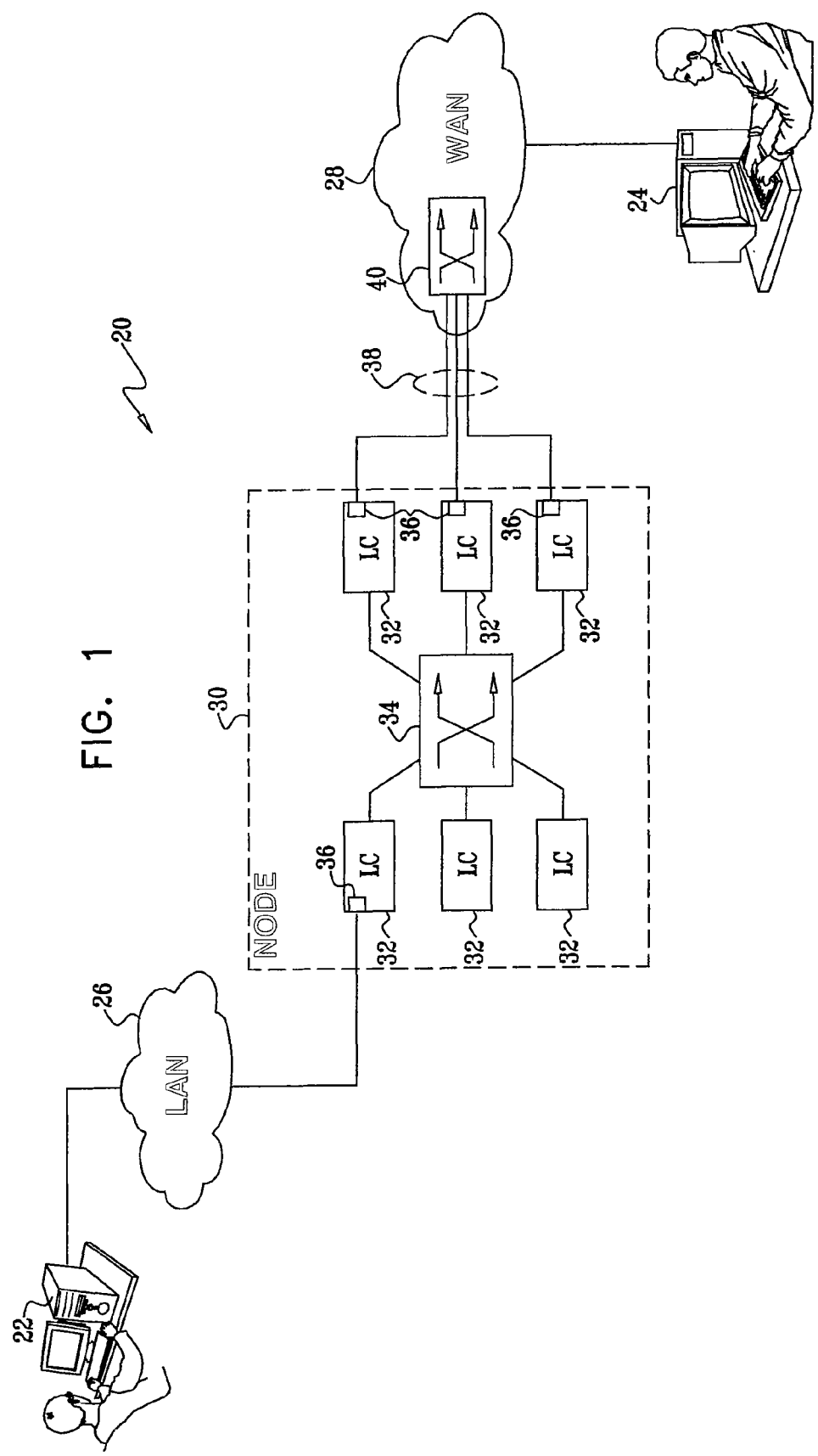
FIG. 1 is a block diagram that schematically illustrates a communication system, in accordance with an embodiment of the present invention.

FIG. 1 is a block diagram that schematically illustrates a communication system 20, in accordance with an embodiment of the present invention. A Layer 2 VPN, in the form of a VPLS, is provisioned in system 20 so as to connect MAC user terminals in different parts of the network, including exemplary terminals 22 and 24. In the scenario shown in the figure, terminal 22 is connected to a LAN, such as an Ethernet LAN, while terminal 24 is connected to a wide area network (WAN) 28, such as the Internet or another Layer 3 network. The VPLS, however, permits the users of terminals 22 and 24 to communicate with one another as though they were connected to the same LAN domain.

Although for the sake of simplicity, only two user terminals are shown in FIG. 1, a given VPLS may typically connect a large number of users at various different locations. Furthermore, although the embodiments described hereinbelow relate only to a single VPLS instance, multiple, different VPLS instances may be provisioned in system 20 so as to serve different groups of users and organizations. The specific configuration of LAN 26 and WAN 28 is shown in FIG. 1 purely by way of illustration, and the principles of the present invention may be applied in substantially any network configuration that supports the provisioning of Layer 2 virtual private networks.

In the exemplary configuration shown in FIG. 1, a network node 30 links LAN 26 and WAN 28. Node 30 comprises multiple line cards 32, linked by a switching core 34. Line cards 32 have ports 36, which connect to other nodes in LAN 26 and WAN 28 (and possibly in other networks, as well). Typically, each line card comprises multiple ports, although only a few ports are shown in FIG. 1. In the description that follows, ports 36 are assumed to be Ethernet ports, for the sake of simplicity of explanation. Alternatively, some or all of the line cards may comprise ports of other types, and may connect to other types of networks, such as Internet Protocol (IP) networks. For example, in an alternative embodiment (not shown in the figures), WAN 28 comprises a Resilient Packet Ring (RPR) network, and some of line cards 32 thus comprise RPR interfaces. Features of a network node that may be used to connect an Ethernet network to a RPR network are described, for example, in U.S. patent application Ser. No. 10/993,882, filed Nov. 19, 2004, which is assigned to the assignee of the present patent application and whose disclosure is incorporated herein by reference. Additionally or alternatively, line cards 32 may connect to tunnels, such as Multi-Protocol Label-Switching (MPLS) tunnels, through WAN 28 via appropriate label-switched routers in the WAN.

In the embodiment shown in FIG. 1, certain ports 36 of line cards 32 are connected by respective physical links to a switch 40 in WAN 28, and these ports are conjoined in a LAG group 38. Such a LAG group may serve one or more VPLS instances. From the point of view of the VPLS, the LAG group is a single logical link having an aggregated bandwidth (i.e., capacity) equal to the sum of the bandwidths of the individual physical links. At the physical level, for example, when a line card receives an incoming packet from LAN 26 that is to be transmitted to WAN 28, the line card chooses one of the ports in the LAG group for outgoing transmission of the packet. The port is typically chosen so as to satisfy load balancing considerations. For example, the line card may apply a hash function to certain fields in the header of each incoming packet in order to choose the port through which to send that packet. The LAG group also provides built-in protection in case one of the physical links in the group fails or otherwise becomes unavailable.

Figure 2:
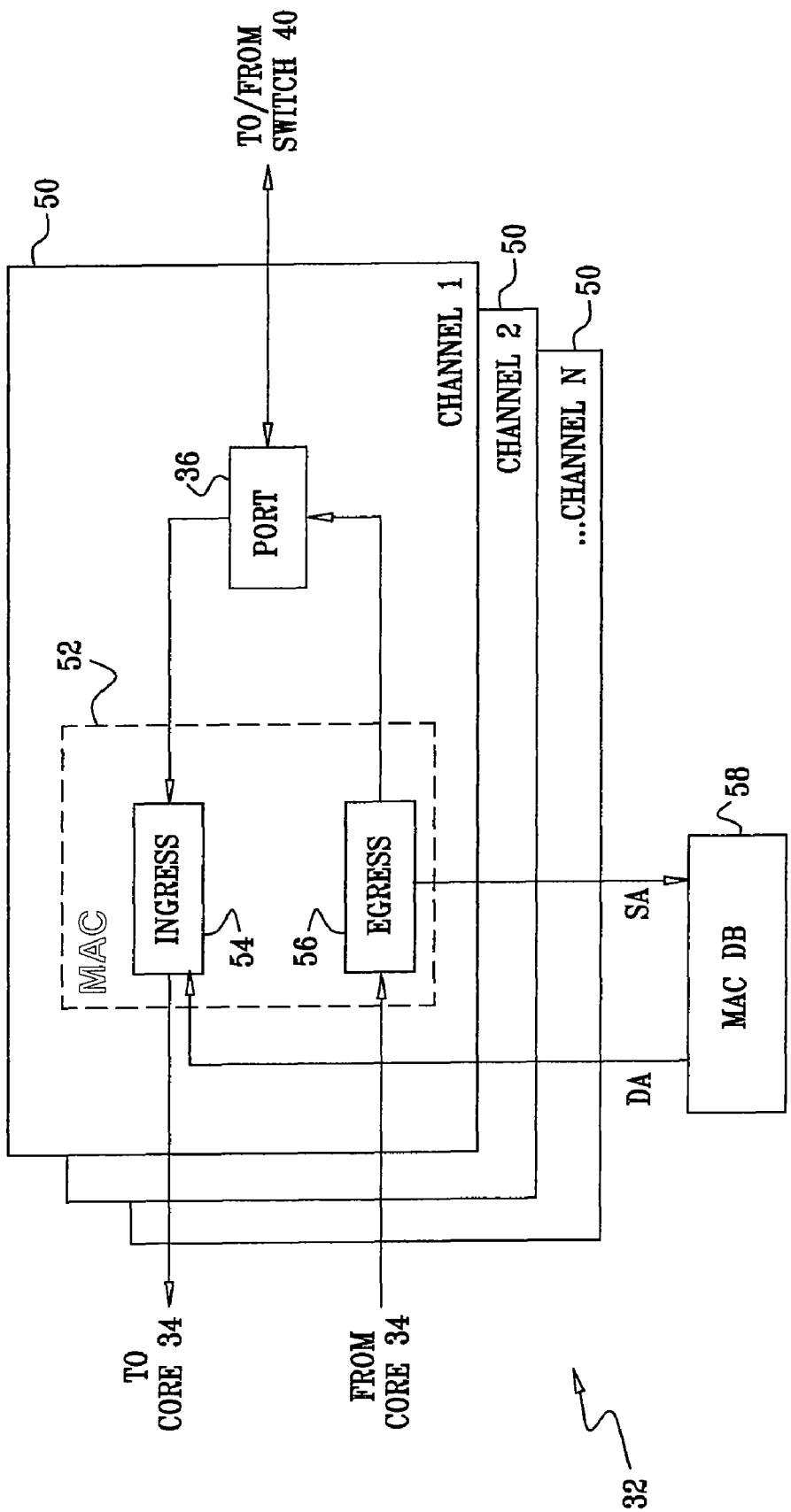
FIG. 2 is a block diagram that schematically shows details of a line card in a network node, in accordance with an embodiment of the present invention.

FIG. 2 is a block diagram that schematically shows details of one of line cards 32 in node 30, in accordance with an embodiment of the present invention. The line card comprises multiple ports 36, each associated with a corresponding processing channel 50. (Although each channel 50 is shown, for the sake of conceptual clarity, as a distinct functional block, in practice the channels may not be distinct physical devices, but may rather be implemented as threads or process carried out by a processing device that serves multiple ports.) In the example shown in FIG. 2, port 36 of the first channel (labeled CHANNEL 1) is assumed to be linked to switch 40 as part of LAG group 38, along with one or more ports on other line cards (not shown in this figure). The ports and associated channels that are linked to LAN 26 or to other nodes and media are similar in design and operation. Channel 50 comprises a packet processor 52, which comprises an ingress path 54 and an egress path 56. Packet processor 52 uses a MAC FDB 58 for MAC learning and forwarding functions. The FDB is shared among the processing channels on line card 32.

It is built and maintained in accordance with a method described hereinbelow with reference to FIG. 3.

In the VPLS environment, each record in FDB 58 corresponds to a particular MAC address belonging to a particular VPLS instance. Optionally, a given VPLS instance may be partitioned into a number of virtual LANs (VLANs), which generally operate in the manner defined in the above-mentioned IEEE Standard 802.1Q. Thus, each record in the database is typically identified by a key that includes the MAC address, VPLS identifier and, optionally, the VLAN identifier or VLAN grouping identifier (known as FID). When the header parameters of an incoming packet are found to match the key, the corresponding record in the database indicates the output interface and other transmission parameters necessary for node 30 to forward the packet on to its destination. For simple Ethernet interfaces, for example, the record may simply identify the line card and port through which the packet should be transmitted. If the packet is to be forwarded via a LAG group, the record identifies the LAG group. The record also contains a "SELF" flag indicating whether the contents of the record were learned by a packet processor on this line card itself from a data packet, or whether the contents were received in a synchronization ("SYNC") packet from another line card, as described hereinbelow.

Upon receiving an incoming packet from switch 40, port 36 passes the packet to ingress path 54. Packet processor 52 identifies the VPLS (typically by a lookup and classification process based on certain packet header fields), extracts the other key parameters from the incoming packet (including the MAC destination address (DA), and optionally, the VLAN identifier), and uses the key to query database 58. If the record is found, the packet processor adds a tag to the packet indicating the egress port through which the packet should be forwarded, as well as the ingress port through which the packet was received. If the output interface indicated by the record is a LAG group, the packet processor selects one of the physical ports in the LAG group (using a hash function, for example), and tags the packet for transmission via the selected port. The packet processor then passes the tagged packet to switching core 34, which conveys the packet to egress path 56 of the appropriate port.

When packet processor 52 receives a packet on ingress path 54 for whose key there is no a corresponding record in database 58, however, it tags the packet for flooding. In this case, switching core 34 will pass the packet for transmission via all the ports (other than the ingress port through which the packet was received) that are used by this VPLS instance. For each LAG group serving the VPLS instance, however, the flooded packet is transmitted via only one port in the group.

Other aspects of MAC database 58 and learning processes that may be applied in building the database, particularly for nodes operating in RPR environments, are described in the above-mentioned U.S. patent application Ser. No. 10/993,882.

Figure 3:
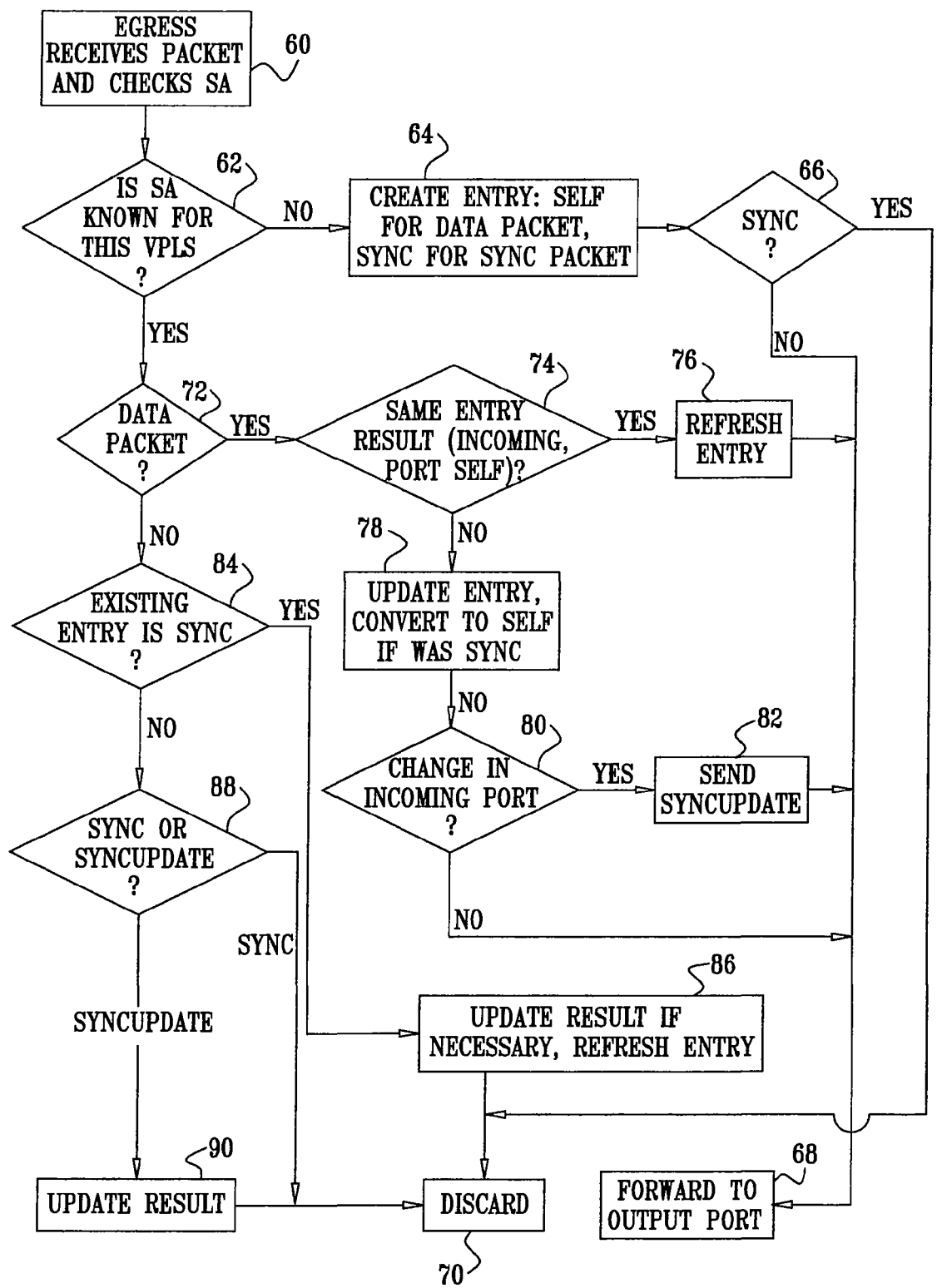
FIG. 3 is a flow chart that schematically illustrates a method for MAC learning, in accordance with an embodiment of the present invention.

FIG. 3 is a flow chart that schematically illustrates a method for MAC learning that is applied by line cards 32 in node 30, in accordance with an embodiment of the present invention. The method is carried out by packet processor 52 as it processes packets on egress path 56, at a forwarding step 60. Learning on egress is advantageous particularly with respect to flooded packets, since in this case multiple line cards receive the packet and are able to learn the interface association of the MAC source address (SA) and VPLS instance.

Packet processor 52 refers to FDB 58 in order to look up the key parameters (MAC SA, VPLS instance and, optionally, VLAN tag) of the packet on egress path 56, at a key checking step 62. If a record with this key does not yet exist in the database, the packet processor creates a new record corresponding to this key, at an entry writing step 64. The record indicates the interface through which subsequent packets received on ingress path 54 with this key should be forwarded, based on the input interface through which the current packet was received. If the packet that generated the new record is a data packet, the packet processor marks the record with the SELF flag, to indicate that it learned the forwarding parameters from a packet forwarded through egress path 56 of its own channel 50. Otherwise, it indicates that this is a SYNC record.

The packet processor then decides what to do with the packet that generated the new record, at a forwarding decision step 66. If the packet is a data packet, it is forwarded to the appropriate output port, at a forwarding step 68. Otherwise, the packet is simply discarded, at a discard step 70.

At certain regular intervals (which should desirably be shorter than the FDB aging time), packet processor 52 sends a synchronization ("SYNC") message to report each SELF entry that it has created in FDB 58 to the other line cards 32 in node 30. This message typically comprises a message packet, having the same headers as the data packets forwarded by node 30, but with a special header field indicating that it is a synchronization message. Switching core 34 conveys this SYNC packet to the other line cards in the same way as it forwards ordinary data packets. The line cards receiving the packet, however, recognize it as a synchronization message and therefore process it internally at step 64 (or step 84, as explained hereinbelow) without forwarding it further.

In order to process a SYNC packet with a new SA at step 64, each line card checks the VPLS instance identified in the packet. If the line card is not configured to serve this VPLS instance, it simply discards the synchronization message. Otherwise, if an entry does not exist for the key fields extracted from the SYNC packet, the line card adds the record to its own FDB. In this case, as noted above, the record has an indication that this is a SYNC entry, which was received from another line card.

Thus, for example (referring back to FIG. 1), when a VPLS packet from terminal 22 is forwarded by node 30 to terminal 24 via switch 40, the packet is forwarded through only one of ports 36 in LAG group 38. All three line cards 32 having ports in the LAG group learn the port association of the MAC address of terminal 22, however, by means of the SYNC packets sent out by the line card through which the packet is forwarded. As a result, when terminal 24 sends a packet back to terminal 22, the line cards associated with LAG group 38 will all be able to forward the packet to the appropriate interface for terminal 22 without flooding. Other line cards that are configured to support this VPLS instance (even if not in the same LAG group) also learn the interface association of the MAC source address from the SYNC packet.

The use of packets to distribute SYNC messages in the manner described above is advantageous in that it makes use of existing forwarding mechanisms within node 30, without the need for an additional control channel in hardware. Alternatively, the synchronization messages may be distributed among the line cards using a dedicated control channel. Further alternatively or additionally, the line cards may distribute each synchronization message only to those other line cards that are registered as serving the VPLS instance in question. The inventors have found, however, that sending SYNC packets indiscriminately to all the line cards simplifies the operation of the MAC learning mechanism while incurring only a moderate additional communication burden. Additional savings can be made by sending multiple synchronization entries within a single packet. In this case, the processing described above is simply repeated for multiple records within the same packet.

An aging mechanism is applied in MAC database 58 in order to remove records that are no longer in effect and free space for new records. For this purpose, each record in the database has a timestamp indicating the time at which it was created or most recently updated. A record with a given key is removed from the database if a predetermined aging time elapses following the timestamp without a further packet having been received with the same key. Aging applies to both SELF and SYNC records, typically having the same aging time for both. To prevent aging of "live" records, line cards 32 refresh the timestamps of the records in the manner described below.

Referring again to FIG. 3, when packet processor 52 determines at step 62 that FDB 58 already contains a record corresponding to the key of the packet currently in its egress path 56, the packet processor decides on how to handle the packet at a decision step 72. If the packet is a data packet, the packet processor checks the record in the FDB to determine whether the current packet matches the record, at a record checking step 74. In other words, the packet processor determines whether the current packet would, if there were no record in the FDB, generate the same record as already exists (i.e., whether the existing record is a SELF record with the same port as the ingress port as the current packet). If so, the packet processor refreshes the timestamp of the record, at a refresh step 76, and then forwards the packet to the appropriate output port at step 68.

On the other, if the packet processor determines at step 74 that the entry in FDB 58 that matches the key of the current packet is a SYNC record, it updates the record appropriately at an update step 78. As part of the update process, the packet processor changes the SYNC indication to SELF in the record. It may also occur at step 78 that upon looking up the key given by the packet in egress path 56, packet processor 52 finds that the ingress port of the packet is different from the interface currently recorded for this key in database 58. This sort of discrepancy may occur, for example, if terminal 24 moves to a different location or if the network configuration changes due to a fault or new installation. In this case, the packet processor writes the new parameters into the SELF record overwriting the old record.

The packet processor determines whether it must inform the other line cards of the change it has made in the FDB record, at an update decision step 80. If there was no change in the interface listed in the record, the packet processor simply forwards the data packet to the appropriate output port at step 68. If the interface has changed, however, the packet processor sends a special SYNCUPDATE packet to the other line cards, at an update step 82. This packet is similar to the SYNC packets described above, but contains an additional "UPDATE" indication. Typically, the SYNCUPDATE packet is sent immediately upon updating the FDB record at step 76, rather than waiting for the scheduled time for transmitting SYNC packets. The data packet that prompted the SYNCUPDATE is forwarded to the appropriate output port at step 68.

Sending the specially-marked SYNCUPDATE packet in this manner ensures that the MAC databases of all the line cards are updated promptly when changes occur, while avoiding race conditions between SYNC packets that may already have been sent between line cards with old information. Packet processors receiving the SYNCUPDATE packet with a result that is different from their own record data, regardless of whether the record is a SYNC or SELF entry, will change the record and set the entry status to SYNC, as described hereinbelow.

Returning now to step 72, if packet processor 52 determines that the current packet is not a data packet (i.e., it is a SYNC or SYNCUPDATE packet), it checks to determine whether the existing record in FDB 58 that corresponds to the key of the current packet is a SYNC or SELF entry, at a record checking step 84. In the case of a SYNC entry, the packet processor updates the record if necessary, at a SYNC update step 86. In other words, if the interface indicated in the packet is different from that indicated in the existing record, the packet processor updates the record in accordance with the packet. The packet processor refreshes the timestamp of the record whether or not the record is changed. It then discards the packet at step 70.

If the packet processor determines at step 84 that the existing record in FDB 58 corresponding to the key of the current packet is marked as a SELF record, it checks the type of the packet at a type checking step 88. If the current packet is a SYNC packet, the packet processor discards the packet at step 70, since SYNC packets do not overwrite SELF entries. On the other hand, If the current packet is a SYNCUPDATE packet, the packet processor overwrites the SELF record in FDB 58 and marks the record as a SYNC entry, at a SYNC update step 90. The packet is then discarded at step 70.

In other embodiments of the present invention (not shown in the figures), redundant links between node 30 and other network elements, such as the parallel links between line cards 32 and switch 40, may be used not only in LAG, but also for protection in case of failure of one of the links. Such embodiments may also benefit from the methods described above for MAC database updating and synchronization. In particular, a standby line card, when activated to provide substitute service in case of failure, can use the synchronized MAC database in order to generate and transmit dummy data packets over each new active link. Upon receiving these packets, other devices in the network learn to use the new active port. This mechanism of dummy packet transmission is described in detail in U.S. patent application Ser. No. 10/036,518, filed Jan. 7, 2002, and published as US 2003/0208618 A1, whose disclosure is incorporated herein by reference. In order to support this protection function, the FDB 58 is updated not only for VPLS instances, as described above, but also for point-to-point services that are terminated over the protected links. In this latter case, the FDB record contains the MAC address and the connection ID, rather than the VPLS ID.

Although the embodiments described above relate specifically to a certain exemplary network and equipment topology and refer to certain specific communication protocols, the principles of the present invention may similarly be applied in other types and topologies of Layer 2 virtual private networks, using different kinds of equipment and protocols. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
   configuring a network node having a plurality of ports, and
   at least first and second line cards with respective first and second ports, to operate as a distributed media access control (MAC) bridge in a Layer 2 data network;

configuring a link aggregation (LAG) group of parallel physical links between two endpoints in said Layer 2 data network joined together into a single logical link, said LAG group having a plurality of LAG ports and a plurality of conjoined member line cards;

providing for each of said member line cards a respective forwarding database (FDB) to hold records associating MAC addresses with ports of said plurality of ports of said network node;

receiving a data packet on an ingress port of said network node from a MAC source address, said data packet specifying a MAC destination address on said Layer 2 data network;

conveying, by transmitting said data packet to said MAC destination address via said first port, said received data packet in said network node to at least said first line card for transmission to said MAC destination address;

if said MAC destination address does not appear in said FDB, flooding said data packet via one and only one LAG port of said plurality of LAG ports;

checking said MAC source address of the data packet against records in said FDB of said first line card; and if said FDB of said first line card does not contain a record of an association of said MAC source address with said ingress port, creating a new record of said association, adding said new record to the FDB of said first line card, and sending a message of the association to each member line card of said plurality of member line cards.

2. The method according to claim 1, wherein sending the message comprises sending messages periodically at predefined times to inform at least the second line card of new associations between the MAC addresses and the respective ports.

3. The method according to claim 1, and comprising receiving the message at the second line card, and responsively to the message, adding the record of the association to the FDB of the second line card if the record does not already exist in the FDB of the second line card.

4. The method according to claim 3, and comprising marking the records in the respective FDB of each line card to distinguish a first type of the records, which are added in response to data packets transmitted via a port of the line card, from a second type of the records, which are added in response to messages received from another of the line cards.

5. The method according to claim 4, and comprising:
associating a respective aging time with each of the records;
refreshing the records in the FDB responsively to further packets transmitted by the line cards; and
removing the records from the respective FDB if the records are not refreshed within the respective aging time.

6. The method according to claim 1, wherein sending the message comprises transmitting a synchronization packet from the first line card via a switching core of the network node to at least the second line card.

7. The method according to claim 6, wherein sending the synchronization packet comprises, if the record in the FDB associates the MAC source address with a port different from the one of the ports on which the data packet was received, changing the record in the FDB of the first line card and sending a synchronization update packet to at least the second line card to indicate that the record has been changed.

8. The method according to claim 1, wherein the network node is configured to operate as multiple virtual MAC bridges in a Layer 2 virtual private network (VPN), wherein each virtual MAC bridge is configured to serve a respective VPN instance, and wherein the records associating the MAC addresses with the respective ports are maintained independently for each of the VPN instances.

9. The method according to claim 8, wherein the VPN instance is a VPLS instance among multiple VPLS instances served by the network node, and wherein sending the message comprises identifying the VPLS instance in the message so as to inform all the line cards that serve the VPLS instance.

10. The method according to claim 1, and comprising:
conveying a further data packet, received from a further MAC source address, to the second line card for transmission over the network;
checking the further MAC source address against the records in the FDB of the second line card; and
responsively to the further data packet, adding a further record with respect to the MAC source address to the FDB of the second line card and sending a further message to inform at least the first line card of the further record.

11. A node for network communication, comprising:
a switching core;
a plurality of ports;
a plurality of member line cards conjoined in a link aggregation (LAG) group of parallel physical links between two endpoints in a Layer 2 data network joined together into a single logical link, having a plurality of LAG ports to forward packets through said switching core so that the node operates as a virtual media access control (MAC) bridge in said Layer 2 data network, said plurality of member line cards including at least first and second line cards, each line card having respective ports and having a respective forwarding database (FDB) to hold records associating MAC addresses with said respective ports of said line cards,
wherein said line cards are arranged so that upon receiving a data packet on an ingress line card from a MAC source address, said data packet specifying a MAC destination address, said ingress line card conveys said data packet via said switching core to at least said first line card for transmission to said MAC destination address, whereupon said first line card checks said MAC source address of said data packet against records in said FDB of said first line card, and if said FDB database of said first line card does not contain a record of an association of said MAC source address with said ingress port, adds said record to the FDB of said first line card and sends a message to at least said second line card informing said second line card of said association, and arranged, when said MAC destination address does not appear in said FDB, to flood said data packet via one and only one of said LAG ports.

12. The node according to claim 11, wherein at least the first line card is adapted to send messages periodically at predefined times to inform at least the second line card of new associations between the MAC addresses and the respective ports.

13. The node according to claim 11, wherein responsively to the message, the second line card adds the record of the association to the MAC database of the second line card if the record does not already exist in the FDB of the second line card.

14. The node according to claim 13, wherein the records in the respective FDB of each line card are marked to distinguish a first type of the records, which are added in response to data packets transmitted via a port of the line card, from a second type of the records, which are added in response to messages received from another of the line cards.

15. The node according to claim 14, wherein a respective aging time is associated with each of the records, and wherein the line cards are operative to refresh the records in the FDB responsively to further packets transmitted by the line cards, and to remove the records from the respective FDB if the records are not refreshed within the respective aging time.

16. The node according to claim 11, wherein the message comprises a synchronization packet, which is transmitted from the first line card via the switching core to at least the second line card.

17. The node according to claim 16, wherein the line cards are operative so that if the record in the FDB associates the MAC source address with a port different from the one of the ports on which the data packet was received, the record in the FDB of the first line card is changed, and the synchronization packet comprises a synchronization update packet, which indicates to at least the second line card to indicate that the record has been changed.

18. The node according to claim 11, wherein at least some of the line cards are configured so that the node operates as multiple virtual MAC bridges in a Layer 2 virtual private network (VPN), wherein each virtual MAC bridge is configured to serve a respective VPN instance, and wherein the records associating the MAC addresses with the respective ports are maintained independently for each of the VPN instances.

19. The node according to claim 18, wherein the VPN instance is a VPLS instance among multiple VPLS instances served by the network node, and wherein the VPLS instance is identified in the message so as to inform all the line cards that serve the VPLS instance of the association.

20. The node according to claim 11, wherein the line cards are adapted to forward a further data packet, received from a further MAC source address, to the second line card for transmission over the network, whereupon the second line card checks the further MAC source address against the records in the FDB of the second line card, and responsively to the further data packet, adds a further record with respect to the MAC source address to the FDB of the second line card and sends a further message to inform at least the first line card of the further record.

* * * * *